United States Patent
Maiden et al.

Patent Number: 5,900,212
Date of Patent: May 4, 1999

[54] HAND-HELD ULTRAVIOLET WATER PURIFICATION SYSTEM

[75] Inventors: Miles Maiden; Robert Watkins, both of Blue Hill, Me.

[73] Assignee: Hydro-Photon, Inc., Blue Hill, Me.

[21] Appl. No.: 08/790,750

[22] Filed: Jan. 27, 1997

[51] Int. Cl.⁶ .................................................. C02F 1/32
[52] U.S. Cl. ......................... 422/24; 422/23; 422/905; 210/748; 250/432 R; 250/433
[58] Field of Search ........................... 422/23, 24, 186.3, 422/905; 210/748; 250/432 R; 426/248; 99/451

[56] References Cited

U.S. PATENT DOCUMENTS

| | | |
|---|---|---|
| 1,956,947 | 7/1934 | Prouty . |
| 2,470,806 | 5/1949 | Del Cueto ............................ 422/24 X |
| 3,500,041 | 3/1970 | Kassing ................................ 422/24 X |
| 3,843,521 | 10/1974 | Zeff ...................................... 422/24 X |
| 3,906,236 | 9/1975 | Callahan ............................... 422/24 X |
| 3,970,856 | 7/1976 | Mahaffey et al. . |
| 4,274,970 | 6/1981 | Beitzel . |
| 4,390,432 | 6/1983 | Takeguchi et al. ..................... 210/748 |
| 4,416,854 | 11/1983 | Neilsen . |
| 4,752,401 | 6/1988 | Bodenstein . |
| 4,762,613 | 8/1988 | Snowball ............................. 210/748 X |
| 4,790,946 | 12/1988 | Jansen . |
| 4,849,100 | 7/1989 | Papandrea . |
| 4,857,204 | 8/1989 | Joklik . |
| 4,902,411 | 2/1990 | Lin ................................... 250/455.1 X |
| 4,971,687 | 11/1990 | Anderson . |
| 4,981,651 | 1/1991 | Horng ...................................... 422/24 |
| 4,992,169 | 2/1991 | Izumiya ................................ 422/24 X |
| 5,106,495 | 4/1992 | Hughes ............................... 210/748 X |
| 5,266,215 | 11/1993 | Engelhard . |
| 5,393,419 | 2/1995 | Tiede et al. . |
| 5,484,538 | 1/1996 | Woodward . |
| 5,628,895 | 5/1997 | Zucholl ................................. 210/96.1 |

FOREIGN PATENT DOCUMENTS

| | | |
|---|---|---|
| 02003892 | 1/1990 | Japan . |
| 08117742 | 10/1994 | Japan . |

*Primary Examiner*—Elizabeth McKane
*Attorney, Agent, or Firm*—Cesari and McKenna, LLP

[57] ABSTRACT

A hand-held water purification system includes a pen-light sized ultraviolet lamp that is enclosed in a quartz cover and is powered by a battery and associated ballast circuitry. The battery and ballast circuitry are connected to the lamp by switches that are under the control of a liquid-level sensor. The sensor connects the battery, the ballast circuitry and the lamp once the sensor determines that the ultraviolet lamp is fully immersed in the water. If the container that holds the water is relatively large, the lamp and quartz cover end of the system are used to stir the water, to ensure that all of the water comes sufficiently close to the ultraviolet lamp.

10 Claims, 2 Drawing Sheets

HAND-HELD ULTRAVIOLET WATER PURIFICATION SYSTEM

FIELD OF THE INVENTION

The invention relates to systems for disinfecting water using ultraviolet light.

BACKGROUND OF THE INVENTION

It is known that ultraviolet ("UV") light in the germicidal range, of approximately 254 nm, can be used to disinfect water, that is, to rid water of bacteria, viruses, algae and so forth. Known prior water purification systems that use UV light are large, installed systems that each include a flow-through subsystem, which causes water to travel past an elongated UV light source that is suspended therein. A quartz sleeve surrounds the UV light source, to protect it and its electrical connections from the water while allowing the UV radiation to pass to the water. Such systems are currently used to purify water for use in, for example, hospitals or schools.

The flow-through subsystems each essentially include a flow-through chamber, i.e., a pipe. As water flows through the pipe, it travels past the quartz sleeve, and thus, the UV light source, and is exposed to UV radiation. The UV radiation kills the bacteria, viruses and so forth that are present in the water. Waste byproducts may build up on the quartz sleeve, and accordingly, the systems include wiper mechanisms that periodically clean the quartz sleeves. These systems typically include a mechanism, such as a viewing port and/or a sensor, for determining the output level of the lamp. A user can visually check the lamp through the view port to ensure both that the lamp is turned on and that the quartz sleeve is sufficiently clean to pass the level of UV radiation required to disinfect the water. The sensor measures the UV radiation for the same purpose.

These flow-through systems work well for disinfecting relatively large quantities of water. They are not, however, suitable for disinfecting small quantities of water.

Today campers, hikers, travelers and the like encounter bacteria and virus infected water in streams, lakes and rivers, and in some countries even in the local plumbing. These hikers, campers and travelers must thus either carry bottled water with them or use portable filtering systems and/or chlorine, hydrogen peroxide or iodine tablets, to disinfect the water. The filtering systems are generally bulky, and thus, inconvenient to carry. Further, while they may remove bacteria and algae from the water, they do not remove viruses, which are typically too small to be caught in the filters. The chemical tablets are certainly portable but they are relatively expensive. Further, the tablets change the taste and smell of the water and add undesirable chemical byproducts to the water. Indeed, the tablet manufacturers generally warn against continuous use of the tablets, for health reasons.

SUMMARY OF THE INVENTION

The invention is a portable, hand-held water purifier that uses UV light to disinfect small quantities, or batches, of water. The water purifier, which is approximately the size and shape of a pen light, has extending from one end a small UV lamp with a quartz cover. The cover, and thus, the lamp, are dipped into a container of water and the lamp is then turned on, to rid the water of infectious agents. As necessary, the user may use the lamp end of the system to agitate the water, to ensure that all of the water passes sufficiently close to the lamp.

The system, which is battery-operated, further includes a liquid-level sensor at the base of the UV lamp. The sensor prevents the lamp from turning on until the lamp is fully immersed in the water. The container and the water act to shield the UV radiation, such that very little is emitted from the container. This prevents potentially harmful UV radiation from reaching the user and, in particular, the user's eyes.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
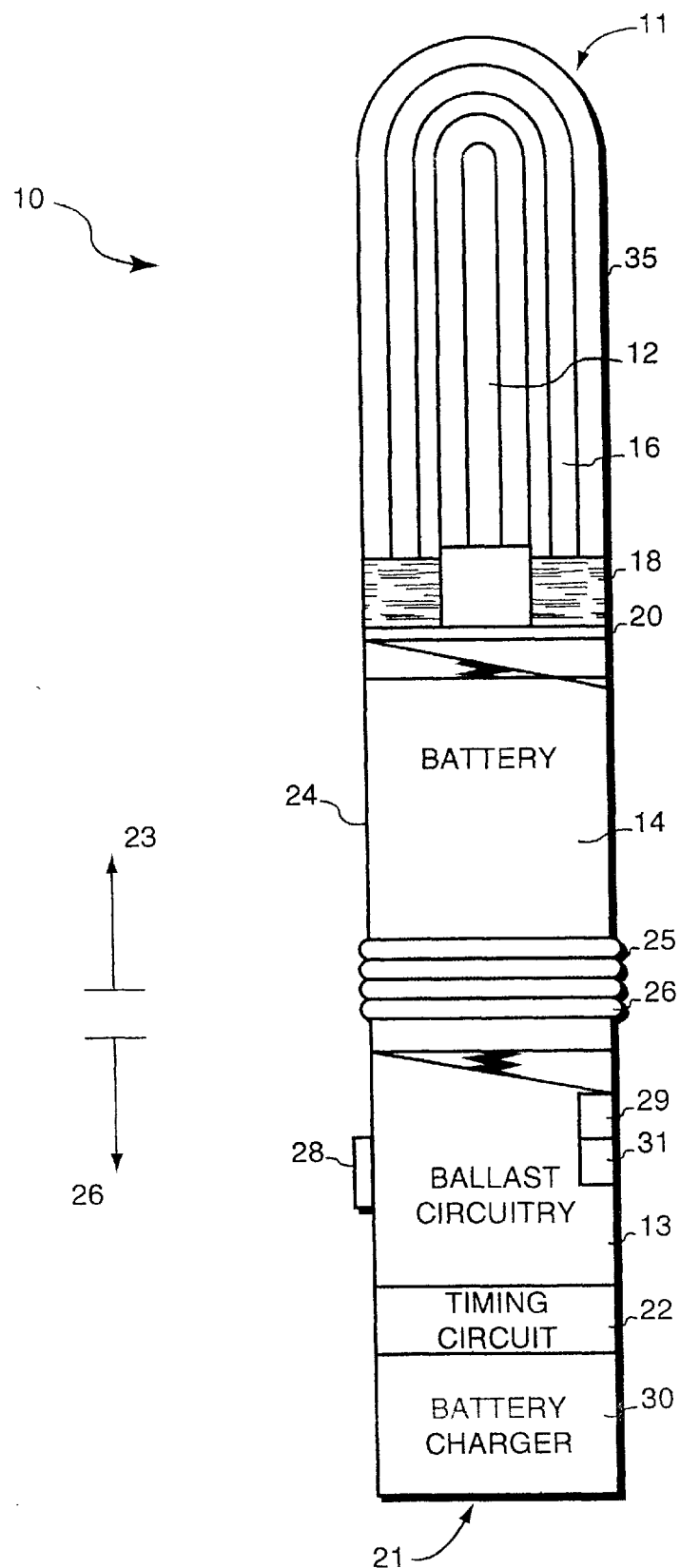
FIG. 1 is a cut away side view of a portable water purification system constructed in accordance with the invention.

FIG. 1 illustrates a portable, hand-held water purification system 10 for disinfecting water in relatively small batches. The system includes, extending from a first end 11, a pen-light sized quartz UV lamp 12 that emits light in the germicidal range. In the exemplary system, the lamp 12 emits light at 254 nm. The lamp is powered through ballast circuitry 13 by a battery 14, which in the exemplary system is a size AA, 3.4 volt rechargeable lithium battery. A quartz cover 16 surrounds the UV lamp 12 on three sides. The quartz cover 16 fits into a holder 18 that also acts as a shock absorber for the lamp 12. The holder 18 thus compresses and bends, as appropriate, should the cover 16, and thus, the lamp 12, bump an edge or side of a container 32 (FIG. 2) into which they are placed. In the exemplary system the holder 18 is made of silicon and forms a water-tight seal with the cover 16, to prevent water from reaching the lamp and the associated circuitry. A removable protective cover 35 protects the lamp and quartz cover when the device is not in use.

A liquid-level sensor 20, which is connected to switches (not shown) between the lamp 12, and the ballast circuitry 13 and battery 14, prevents the UV lamp from turning on until it is fully immersed in water. The UV radiation from the lamp is then absorbed and/or reflected by the water and the container such that very little of the UV radiation escapes from the container. The user, who is holding the other end 21 of the system, is thus protected from harmful levels of the UV radiation, which might otherwise adversely affect his or her eyes.

The sensor 20 may, for example, be a capacitive-type sensor that senses the difference in capacitance of the water and the surrounding air. When the sensor determines that it is in water, which necessarily means that the lamp is immersed in the water, the sensor closes the switches and allows the lamp to be turned on.

The water purifier 10 may also include a timing circuit 22 connected between the sensor and the lamp and associated circuitry. The timing circuit turns the lamp off a predetermined time, for example, 15 seconds, after the sensor 20 turns the lamp on.

The battery 14 and related circuitry are encased in a water-resistant tube 24. In the exemplary embodiment, the tube 24 is constructed of stainless steel. The entire water purifier is approximately six and three-quarters inches long and five-eighths of an inch in diameter, and fits comfortably in one hand. The tube 24 includes two parts, namely, a top 23 and a bottom 26, that screw together at a joint 25, so that the battery 14 can be replaced, as necessary. A silicon O-ring 26 makes the joint 25 water-tight.

The user controls the system with an on-off switch 28. As discussed above, the lighting of the lamp 12 is ultimately controlled by the liquid-level sensor 20, such that the lamp lights only when both the is on-off switch 28 is in the on position and the lamp is fully immersed in water.

The water purifier 10 may also include a battery charger 30, which in the exemplary system is a conventional inductive-type charging circuit. Further, the purifier may include a power-on LED 29 and a low-battery LED 31, which indicate to a user, respectively, that the UV lamp is lit and that the battery needs replacing or recharging.

Figure 2:
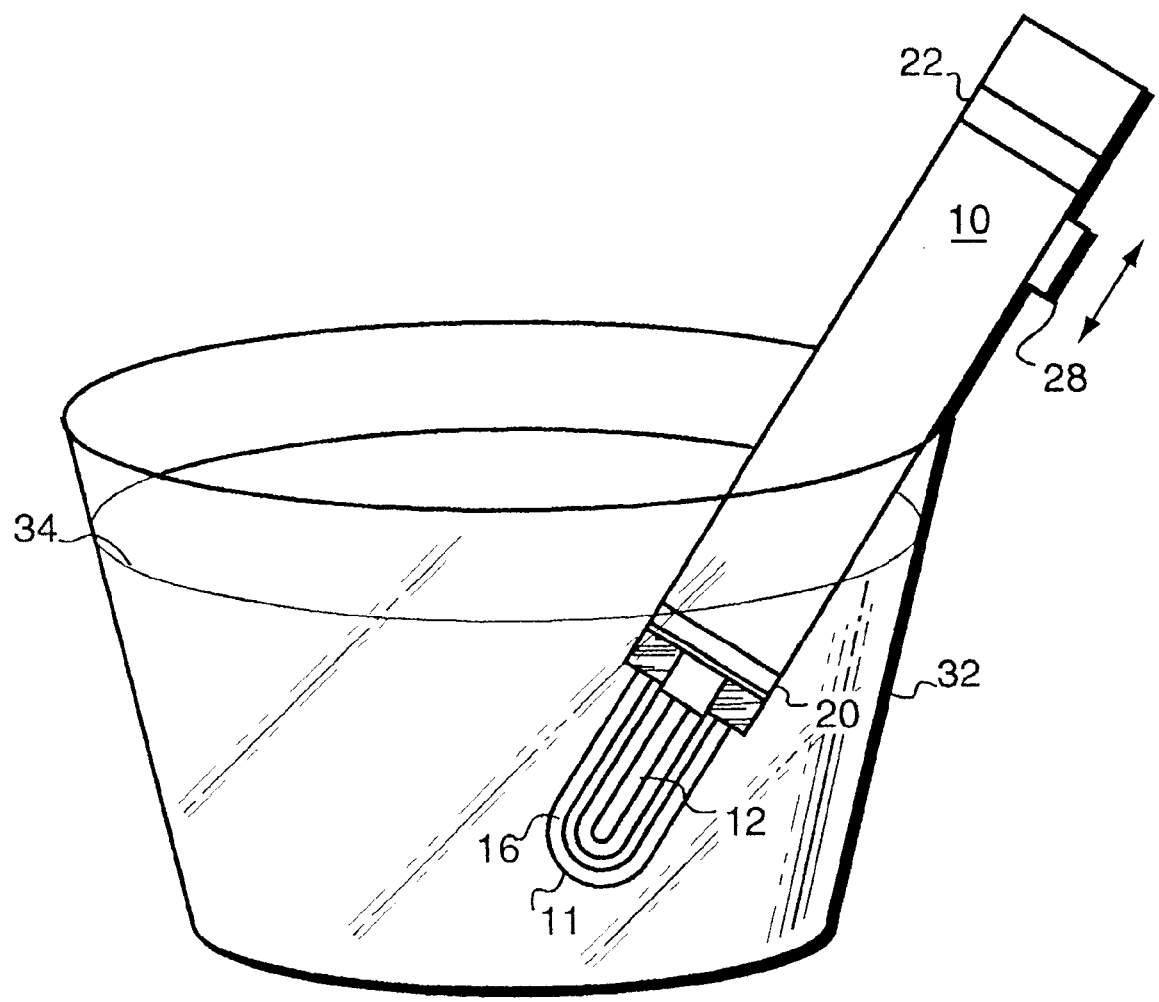
FIG. 2 illustrates the portable water purification system of FIG. 1 in use.

Referring now to FIG. 2, a user places the lamp end 11 of the water purifier 10 in water 34 that is, in the example, contained in a drinking glass 32. The user turns the system 10 on by moving the on-off switch 28 to the appropriate position. When the liquid-level sensor 20 determines that the lamp is fully immersed in the water, the sensor closes the switches (not shown) that separate the ballast circuitry 13 and the battery 14 (FIG. 1) from the lamp 12, and the lamp then turns on. The sensor 20 also starts the timing circuit 22 that keeps the lamp lit for a predetermined time.

The user may use the lamp end 11 of the system 10 to stir the water 34, to ensure that all of the water comes sufficiently close to the source of the UV radiation. If the container is small, however, the user need not stir the water.

After use, the user may wipe or wash the quartz sleeve 16, to clear away any waste byproducts that may have adhered to the sleeve and may adversely affect the output level of the device. Accordingly, the hand held purifier need not include a complex wiping mechanism and associated radiation-level sensor, as is required in the prior flow-through systems.

The hand-held UV water purification system 10 is thus a fully portable system that disinfects relatively small quantities, or batches, of water, such as the water contained in a drinking glass. The water purifier 10 is small and light weight so that it is easily and conveniently used when traveling, hiking, camping and so forth. This is in contrast to known flow-through UV water purification systems that are designed to disinfect large quantities of water for schools, hospitals and so forth. Such flow-through systems are installed such that water is piped past an elongated UV light source that is permanently suspended in the piping. These flow-through systems do not work with the small quantities of water with which the hand-held portable system is expected to be used, and are not conveniently portable.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A hand-held water purification system including:
   A. a case that supports the system, the case having an interior, an exterior, a first end and a second end and being sized to be held in one hand;
   B. a battery and associated ballast circuit that fit into the interior of the case and power an ultraviolet light source;
   C. an ultraviolet light source and associated ultraviolet transmissive cover for immersion into non-flowing water with the light source turning on to purify the water, the ultraviolet light source extending outwardly from the first end of the case and the ultraviolet transmissive cover having a first end and a second end and fitting over the ultraviolet light source, the cover attaching at the first end to the case to form a water-tight enclosure for the light source and extending outwardly from the case; and
   D. a liquid-level sensor that prevents the light source from turning on until the light source is immersed in water.

2. The system of claim 1 further including a timing circuit that turns the light source off a predetermined time after the sensor turns the light source on.

3. The system of claim 1 wherein:
   a. the battery is rechargeable; and
   b. the system further includes a battery charger.

4. A method of purifying water that is held in a container, the method including the steps of:
   A. turning a hand-held water purification system on;
   B. holding the system by hand, so as to immerse in the water to be purified, an ultraviolet light source and associated water-tight ultraviolet transmissive cover that are part of the hand-held water purification system and extend outwardly from other system components to form a first end of the system;
   C. sensing that the light source is immersed fully in the water;
   D. turning the light source on to emit ultraviolet radiation in the container, the radiation purifying the water; and
   E. turning the light source off and removing the light source and associated cover from the water after a predetermined time associated with purifying the water.

5. The method of claim 4 further including the step of agitating the water by stirring the water with the first end of the system.

6. The method of claim 4 further including the step of turning the light source off a predetermined time after the light source is turned on.

7. The method of claim 4 further including the step of turning the light source off a predetermined time after the light source is turned on.

8. The method of purifying water of claim 7 further including the step of removing the lamp and water-tight ultraviolet transmissive cover from the container after the lamp is shut off.

9. A method of purifying water that is held in a container, the method including the steps of:
   A. immersing in the water to be purified an outwardly extending ultraviolet light source and associated water-tight ultraviolet transmissive cover;
   B. turning the light source on to emit ultraviolet radiation in the water;
   C. agitating the water by stirring the water with the light source and cover end of the system, the radiation from the light source purifying the water;
   D. turning the light source off and removing the light source and associated cover from the water.

10. The method of claim 9 further including the step of sensing that the light source is immersed fully in the water before turning on the light source.

* * * * *